US012608318B2

(12) United States Patent
Riocreux et al.

(10) Patent No.: US 12,608,318 B2
(45) Date of Patent: Apr. 21, 2026

(54) ACCESSING TRANSACTION CONFIGURATION DATA

(71) Applicant: Arm Limited, Cambridge (GB)

(72) Inventors: Peter Andrew Riocreux, Cheadle (GB); Edit Csakurda, Budapest (HU); Robert Sarkoezi, Biatorbagy (HU); László Kriskó, Budapest (HU)

(73) Assignee: Arm Limited, Cambridge (GB)

( * ) Notice: Subject to any disclaimer, the term of this patent is extended or adjusted under 35 U.S.C. 154(b) by 8 days.

(21) Appl. No.: 18/651,888

(22) Filed: May 1, 2024

(65) Prior Publication Data

US 2025/0342122 A1      Nov. 6, 2025

(51) Int. Cl.
| | |
|---|---|
| *G06F 12/08* | (2016.01) |
| *G06F 9/32* | (2018.01) |
| *G06F 12/0871* | (2016.01) |
| *G06F 12/0891* | (2016.01) |

(52) U.S. Cl.
CPC .......... *G06F 12/0871* (2013.01); *G06F 9/321* (2013.01); *G06F 12/0891* (2013.01)

(58) Field of Classification Search
CPC ... G06F 12/0871; G06F 9/321; G06F 12/0891
See application file for complete search history.

(56) References Cited

U.S. PATENT DOCUMENTS

| | | | | |
|---|---|---|---|---|
| 9,208,095 B2* | 12/2015 | Pesavento | ........... | G06F 12/0862 |
| 2002/0131310 A1* | 9/2002 | Kuwata | .............. | G06F 12/0866 |
| | | | | 711/E12.019 |
| 2019/0332545 A1* | 10/2019 | Xu | ...................... | G06F 12/0804 |

FOREIGN PATENT DOCUMENTS

| | | | | |
|---|---|---|---|---|
| GB | 2593716 A | * | 10/2021 | ......... G06F 12/0891 |

* cited by examiner

*Primary Examiner* — Masud K Khan

(74) *Attorney, Agent, or Firm* — NIXON & VANDERHYE P.C.

(57) ABSTRACT

Apparatuses, systems, methods, computer-readable media, and computer code are disclosed. An apparatus comprises transaction circuitry configured to control transactions, wherein a configuration of each transaction is controlled by a corresponding unit of configuration data; and a configuration cache configured to hold a plurality of units of configuration data. Each transaction specifies a storage location in the configuration cache at which the corresponding unit of configuration data is stored, and the transaction circuitry is configured to access the corresponding unit of configuration data at the storage location to control each transaction.

20 Claims, 12 Drawing Sheets

24

| configuration cache | | |
|---|---|---|
| index | configuration data | usage counter |
| 0 | config_0 | 2 |
| 1 | config_1 | 0 |
| 2 | config_2 | 1 |
| 3 | config_3 | 0 |

FIG. 4

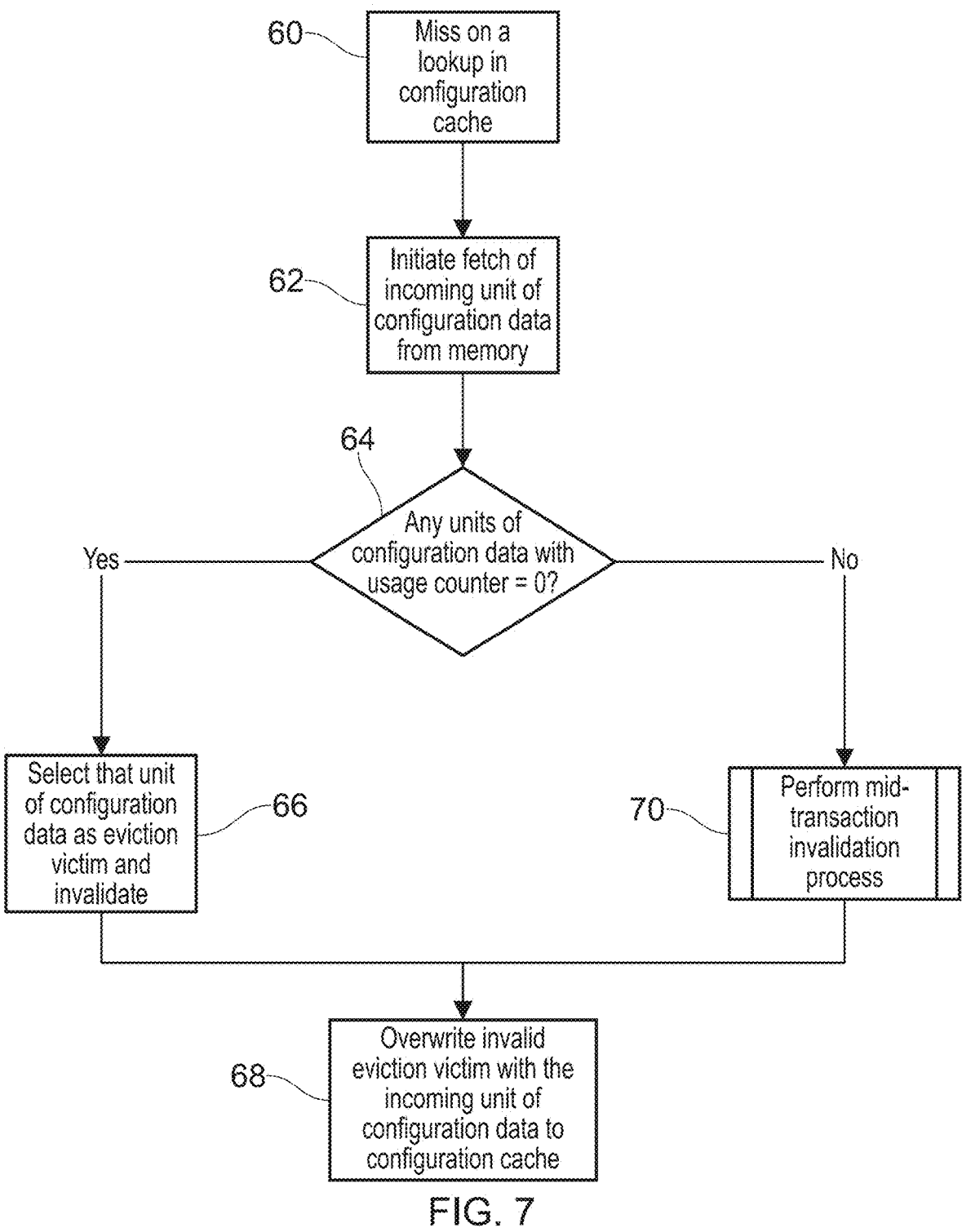

60 — Miss on a lookup in configuration cache

62 — Initiate fetch of incoming unit of configuration data from memory

64 — Any units of configuration data with usage counter = 0?

Yes

No

66 — Select that unit of configuration data as eviction victim and invalidate

70 — Perform mid-transaction invalidation process

68 — Overwrite invalid eviction victim with the incoming unit of configuration data to configuration cache

FIG. 7

ACCESSING TRANSACTION CONFIGURATION DATA

TECHNICAL FIELD

The present disclosure relates to data processing. In particular, the present disclosure relates to controlling transactions.

DESCRIPTION

A data processing apparatus may initiate a memory access request for the movement of data between the data processing apparatus and memory. The memory access request may trigger one or more transactions to be performed in order to complete the memory access request. The particular way in which these memory access requests are handled by the interface between the data processing apparatus and the memory can therefore significantly affect the efficiency of memory accesses, and hence the performance of data processing as a whole.

SUMMARY

In one example embodiment described herein there is an apparatus comprising: transaction circuitry configured to control transactions, wherein a configuration of each transaction is controlled by a corresponding unit of configuration data; and a configuration cache configured to hold a plurality of units of configuration data, wherein each transaction specifies a storage location in the configuration cache at which the corresponding unit of configuration data is stored, and the transaction circuitry is configured to access the corresponding unit of configuration data at the storage location to control each transaction.

In another example embodiment described herein there is provided a system comprising: an apparatus as described above implemented in at least one packaged chip; at least one system component; and a board, wherein the at least one packaged chip and the at least one system component are assembled on the board.

In another example embodiment described herein there is provided a chip-containing product comprising the system described above, assembled on a further board with at least one other product component.

In another example embodiment described herein there is provided a method comprising: controlling transactions, wherein a configuration of each transaction is controlled by a corresponding unit of configuration data; and holding a plurality of units of configuration data in a configuration cache, wherein each transaction specifies a storage location in the configuration cache at which the corresponding unit of configuration data is stored, and accessing the corresponding unit of configuration data at the storage location to control each transaction.

In another example embodiment described herein there is provided a non-transitory computer-readable medium to store computer-readable code for fabrication of an apparatus comprising: transaction circuitry configured to control transactions, wherein a configuration of each transaction is controlled by a corresponding unit of configuration data; and a configuration cache configured to hold a plurality of units of configuration data, wherein each transaction specifies a storage location in the configuration cache at which the corresponding unit of configuration data is stored, and the transaction circuitry is configured to access the corresponding unit of configuration data at the storage location to control each transaction.

BRIEF DESCRIPTION OF THE DRAWINGS

The present invention will be described further, by way of example only, with reference to embodiments thereof as illustrated in the accompanying drawings, in which:

FIG. 4 schematically illustrates example content of a configuration cache according to some example embodiments;

FIG. 7 shows a sequence of steps for allocating an incoming unit of configuration data in a configuration cache according to some example embodiments;

DESCRIPTION OF EXAMPLE EMBODIMENTS

Figure 1:
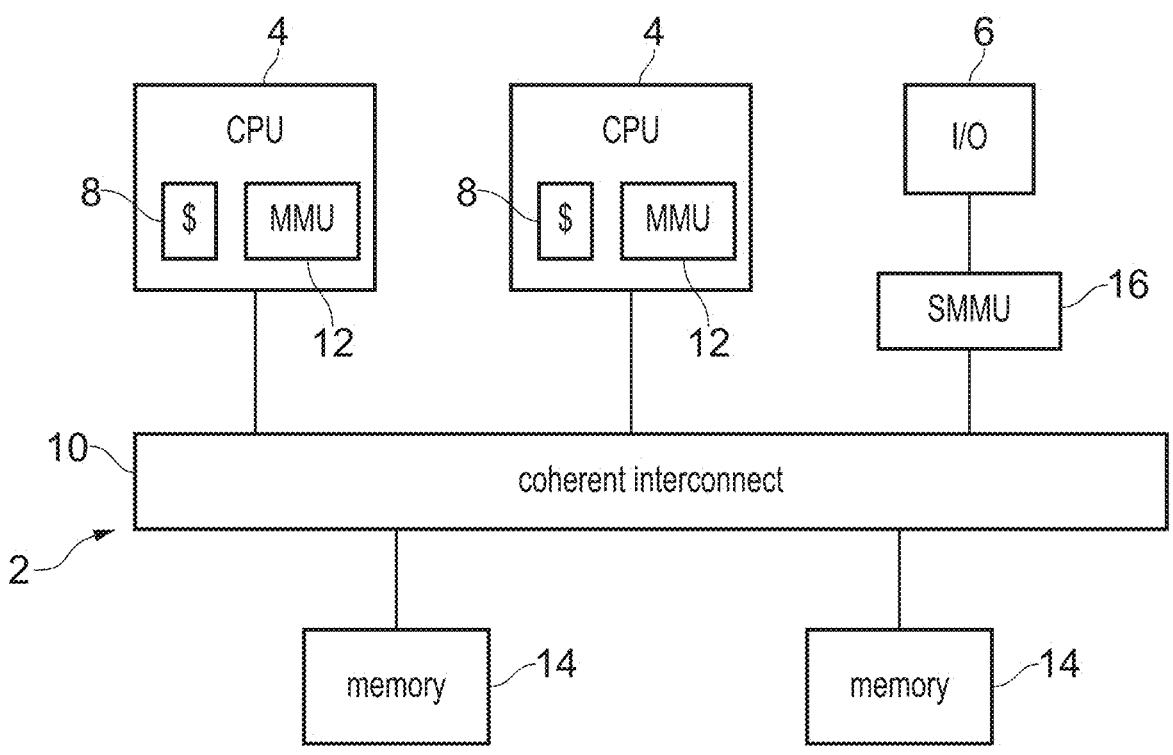
FIG. 1 schematically illustrates a data processing system comprising an apparatus according to some example embodiments.

Before discussing the embodiments with reference to the accompanying figures, the following description of embodiments is provided.

In accordance with one example configuration there is provided an apparatus comprising transaction circuitry configured to control transactions. An example of such a transaction is triggered in response to a memory access request, in which various operations take place such as translating a memory address, verifying memory attributes, and evaluating cachability/sharability attributes. The transaction circuitry may control the transactions in a pipelined manner such that multiple transactions are active or 'in-flight' at any point in time. The apparatus is further provided with a configuration cache in which a plurality of units of configuration data is stored. The configuration data is used by the transaction circuitry to control how a transaction is performed. In particular, the configuration of each transaction is controlled by a corresponding unit of configuration data. Accordingly, at one or more stages of each transaction, the transaction circuitry may refer to the corresponding unit of configuration data to determine how the transaction is to be controlled. Throughout this description, where a transaction is described to be "using" a corresponding unit of configuration data, this is to be understood to mean that the transaction circuitry is controlling the configuration of that transaction in dependence on the corresponding unit of configuration data.

One approach for accessing the configuration data is to fetch the unit of configuration data from the configuration cache and temporarily store the unit of configuration data, for example in one or more registers, at the current stage of the transaction. However, a problem with this approach is that the transaction circuitry may be required to refer to the unit of configuration data again at a later stage of the transaction where the stored unit of configuration data is inaccessible (e.g. the previous registers are being used by a younger transaction in the pipeline). Therefore, the transaction circuitry may be required to fetch the unit of configuration data from the configuration cache again, thus causing further latency.

According to the present techniques, each transaction specifies a storage location of the configuration cache at which the corresponding unit of configuration data is stored, thereby allowing the transaction circuitry to access the corresponding unit of configuration data at the storage location to control the transaction. By specifying the storage location in the transaction itself, the transaction circuitry can access the unit of configuration data in the configuration cache directly, without the added latency of performing a cache lookup. The storage location as specified by the transaction may take various forms depending on the structure of the configuration cache. For example, the specification of the storage location may include index and/or way information for the entry containing the corresponding unit of configuration data.

As a result of faster access to the cache, there is a lessened penalty due to only accessing to the configuration data in the configuration cache without temporarily storing the configuration data as described above. Accordingly, some implementations of the transaction circuitry may exclude any temporary storage (e.g. the one or more registers) for storing the configuration data, thus reducing the circuit area and power usage of the transaction circuitry while still having fast access to the configuration data for controlling transactions.

In examples where the transaction circuitry is configured to perform multiple active transactions at the same time, it is possible for the configuration of a plurality of those active transactions to be controlled by the same unit of configuration data. One approach to handling this is temporarily to store multiple copies of the unit of configuration data at various stages of the transaction circuitry. However, according to the present techniques, this is not necessary because the plurality of transactions can each specify a same storage location in the configuration cache. Accordingly, instead of reading multiple copies of the unit of configuration data from the configuration cache, the transaction circuitry can access the storage location of the configuration cache directly to read the unit of configuration data and determine how each of the plurality of transactions are to be controlled.

Since the unit of configuration data itself is not stored locally, it is advantageous to protect the storage location specified by active transactions from replacement so that, when the transaction circuitry accesses the storage location, the correct unit of configuration data will still be in the configuration cache if required. Accordingly, in some examples, the configuration cache is configured to store a usage counter associated with each of the plurality of units of configuration data. The usage counter is indicative of a number of active transactions specifying the storage location of the associated unit of configuration data. For example, if a unit of configuration data is not being used by an active transaction, the associated usage counter is equal to 0. If a unit of configuration data is being used by one active transaction, the associated usage counter is equal to 1, and so on.

The configuration cache may be configured to detect one or more events and to adjust the value of the usage counter in response. For example, if the configuration cache detects that a transaction that uses a particular unit of configuration data has been initiated, the usage counter associated with that unit of configuration data is incremented. After that transaction has been completed, the transaction circuitry may signal that the transaction has been completed or retired. The configuration cache may therefore detect that the transaction is no longer using the unit of configuration data at the storage location, and the usage counter associated with that unit of configuration data is decremented.

Since the transaction circuitry may not have the relevant storage location when a transaction is first initiated, the transaction circuitry may perform a lookup in the configuration cache when the unit of configuration data is first needed. Afterwards, the storage location will be known and the transaction specifies the storage location as described above. Accordingly, in some examples, the configuration cache detects that the transaction circuitry has initiated the transaction in response to the transaction circuitry performing the initial lookup in the configuration cache.

In some examples, replacement of units of configuration data in the configuration cache is controlled by allocation control circuitry, which is configured to control allocation of an incoming unit of configuration data in a configuration cache. The incoming unit of configuration data may be caused by a transaction being initiated when the corresponding unit of configuration data is not present in the configuration cache. Therefore, an initial lookup in the configuration cache would result in a miss, triggering the incoming unit of configuration data to be fetched from memory. If there is no available capacity in the configuration cache (e.g. because the configuration cache is already full with the configuration data of previous transactions), the allocation control circuitry selects one of the units of configuration data to be an eviction victim and replaced by the incoming unit of configuration data. This may be performed in dependence on any applicable eviction policy, such as least recently used (LRU), least frequently used (LFU), first in first out (FIFO), etc. Additionally and in accordance with the present techniques, the selection of the eviction victim may also be in dependence on a value of the associated usage counter.

The allocation control circuitry may priorities the eviction of a unit of configuration data for which the associated usage counter indicates that no active transactions are specifying the storage location of that unit of configuration data. For example, if an LRU policy initially selects an eviction victim that is being specified by an active transaction (and hence has a usage counter indicating that there is an active transaction specifying this unit of configuration data), the allocation control circuitry may instead select a second-most recently used unit of configuration data. If the second-most recently used unit of configuration data is also being specified by an active transaction (and hence has a usage counter indicating that there is an active transaction specifying this unit of configuration data), the allocation control circuitry may instead select a third-most recently used unit of configuration data, and so on.

According to the above selection process, once a unit of configuration data associated with a usage counter indicating that no active transactions are specifying the storage location has been selected as the eviction victim, the allocation control circuitry evicts the eviction victim. The eviction may involve removing the unit of configuration data from the configuration cache to a higher cache level or simply marking it as invalid. Accordingly, when the incoming unit of configuration data has been fetched from memory, the incoming unit of configuration data is written into the (now available) storage location of the eviction victim.

It is possible for every unit of configuration data to be being used by active transactions. Whichever eviction victim is selected by the allocation control circuitry will therefore be associated with a usage counter indicating that active transactions are specifying the storage location of the eviction victim. If this occurs, the allocation control circuitry is configured to stall a new transaction having a configuration that is controlled by the incoming unit of configuration data while the eviction victim is being evicted from the configuration cache. The allocation control circuitry may handle the eviction of the eviction victim in several different ways.

In some examples, the allocation control circuitry may simply wait until any transactions that use the eviction victim have completed. Accordingly, the allocation control circuitry does not evict the eviction victim until the value of the usage counter indicating that no active transactions are specifying the storage location of the eviction victim. When this is the case, the allocation control circuitry allocates the incoming unit of configuration data to the configuration cache and stops causing the new transaction to stall.

In some examples, it may be desired that the incoming unit of configuration data is allocated to the configuration cache sooner. This may occur if the new transaction was, for example, of higher priority than the currently active transactions. In such examples, the allocation control circuitry is configured to perform a mid-transaction invalidation process. The particular steps of the mid-transaction invalidation process may vary, but the purpose is to cause the eviction victim to be invalidated while the active transaction is still being performed, such that the eviction victim can be evicted from the configuration cache sooner to allow the incoming unit of configuration data to be allocated sooner.

When performing the mid-transaction invalidation process, the allocation control circuitry causes the transaction circuitry to stop accessing the eviction victim and then evicting the eviction victim from the configuration cache in response to the value of the usage counter indicating that no active transactions are specifying the storage location of the eviction victim.

As part of the causing step above, the allocation control circuitry may mark the eviction victim as invalid while retaining it in the configuration cache. The transaction circuitry is then prevented from accessing the eviction victim to control any future transaction while the eviction victim is marked as invalid. Accordingly, when the transaction circuitry attempts to access the eviction victim for a new transaction, the lookup returns a miss even though the configuration data is actually present. This prevents the usage counter from being incremented by the configuration cache as described above and therefore causes the eviction victim to be evicted sooner than if the allocation control circuitry simply waited as described above.

Some active transactions may have been initiated a predetermined period of time before the mid-transaction invalidation process was begun. The allocation control circuitry may allow those preceding transactions to complete by permitting the transaction circuitry to access the eviction victim to control the preceding transactions even while the eviction victim is marked as invalid. The predetermined period of time may vary between implementations. For example, upon beginning the mid-transaction invalidation process, the allocation control circuitry may define a point in time where transactions that had been initiated before that point can continue to use the eviction victim (i.e. the configuration cache will return a hit), whereas transactions that had been initiated after that point cannot use the eviction victim (i.e. the configuration cache will return a miss). In some examples, the predetermined amount of time may be zero, such that the defined point in time is the moment at which the mid-transaction invalidation process begins.

Alternatively or in addition, the mid-transaction invalidation process includes causing the transaction circuitry to restart one or more transactions that are specifying the storage location of the eviction victim. This speeds up the rate at which those transactions are determined to be "completing", and thereby the rate at which the value of the usage counter is decremented. Accordingly, the eviction victim can be evicted from the configuration cache sooner to allow the incoming unit of configuration data to be allocated sooner.

As an alternative to causing the transaction circuitry to stop accessing the eviction victim, the mid-transaction invalidation process can instead include evicting the eviction victim regardless of whether active transactions are still using the eviction victim. In such examples, the apparatus comprises eviction tracking circuitry for tracking evicted entries from the configuration cache. Accordingly, when the eviction victim is evicted as part of the mid-transaction invalidation process, details of the eviction victim are recorded in the eviction tracking circuitry. Such details include the storage location of the eviction victim and the value of the usage counter at the time when the eviction victim was evicted. The configuration cache may then monitor incoming accesses to that storage location by the transaction circuitry to identify whether the active transaction is attempting to access the (now evicted) unit of configuration data. If so, then the transaction circuitry restarts the transaction. Accordingly, although the transaction circuitry can still access the storage location that now contains the incoming unit of configuration data, the information stored in the eviction tracker prevents the transaction circuitry from using the incorrect configuration data to control the transaction.

As described above, when the transaction circuitry initiates a new transaction, the transaction circuitry is configured to perform a lookup of the configuration cache for the corresponding unit of configuration data. If the lookup results in a hit, then the transaction can proceed as described above. However, if the lookup results in a miss, then a fetch request the corresponding unit of configuration data from memory is generated. In accordance with the present techniques, if a lookup results in a miss, the configuration cache inserts a hazarding entry at the storage location at which the corresponding unit of configuration data will be stored after being fetched. This hazarding entry therefore indicates to any younger transactions that the corresponding unit of configuration data is currently being fetched from memory. In other words, it is not necessary to generate another fetch request for that unit of configuration data, thus reducing traffic in the memory system.

In some examples, such as those where the transaction circuitry performs multiple transactions in a pipelined configuration, a younger transaction may require the same unit of configuration data before that unit of configuration data has been fetched from memory. Accordingly, a further lookup of the configuration cache performed by the transaction circuitry would result in a hit on the hazarding entry that had been previously inserted by the configuration cache as described above. Accordingly, the transaction circuitry is configured to prevent the transaction from continuing. When the corresponding unit of configuration data has been fetched, the new transaction above and the younger transaction can be allowed to proceed.

In accordance with another example configuration there is provided a method comprising controlling transactions, wherein a configuration of each transaction is controlled by a corresponding unit of configuration data; and holding a plurality of units of configuration data in a configuration cache, wherein each transaction specifies a storage location in the configuration cache at which the corresponding unit of configuration data is stored, and accessing the corresponding unit of configuration data at the storage location to control each transaction.

In accordance with another example configuration there is provided a non-transitory computer-readable medium to store computer-readable code for fabrication of an apparatus comprising transaction circuitry configured to control transactions, wherein a configuration of each transaction is controlled by a corresponding unit of configuration data; and a configuration cache configured to hold a plurality of units of configuration data, wherein each transaction specifies a storage location in the configuration cache at which the corresponding unit of configuration data is stored, and the transaction circuitry is configured to access the corresponding unit of configuration data at the storage location to control each transaction.

Particular embodiments will now be described with reference to the figures.

FIG. 1 schematically illustrates an example of a data processing system 2. The system 2 includes a number of master devices 4, 6 which in this example include two central processing units (CPUs) 4 and an input/output unit 6 for controlling input or output of data from/to a peripheral device. It will be appreciated that many other types of master devices could also be provided, such as graphics processing units (GPUs), a display controller for controlling display of data on a monitor, direct memory access controllers for controlling access to memory, etc. At least some of the master devices may have internal data or instruction caches 8 for caching instructions or data local to the device. Other masters such as the input/output interface 6 may be uncached masters. Coherency between data in the respective caches and accessed by the respective masters may be managed by a coherent interconnect 10, which tracks requests for accesses to data from a given address and controls snooping of data in other masters' caches when required for maintaining coherency. It will be appreciated that in other embodiments such coherency operations could be managed in software, but a benefit of providing a hardware interconnect 10 for tracking such coherency is that the programmers of the software executed by the system do not need to consider coherency.

Some masters include a memory management unit (MMU) 12 for controlling the master's access to memory 14 via a coherent interconnect 10. It is also possible to provide a system memory management unit (SMMU) 16 which is not provided within a given master device, but is provided as an additional component between a particular master 6 and the coherent interconnect 10, for allowing simpler master devices which are not designed with a built-in MMU to access memory. In other examples the SMMU 16 could be considered part of the interconnect 10.

Any one or more of the MMUs 12 or the SMMU 16 may embody an apparatus according to the present techniques.

Although the following description will refer only to the MMU 12 for the purposes of simpler explanation, it will be appreciated that the present techniques could be equally applied to the SMMU 16 or any other type of circuitry performing transactions controlled by configuration data.

Figure 2:
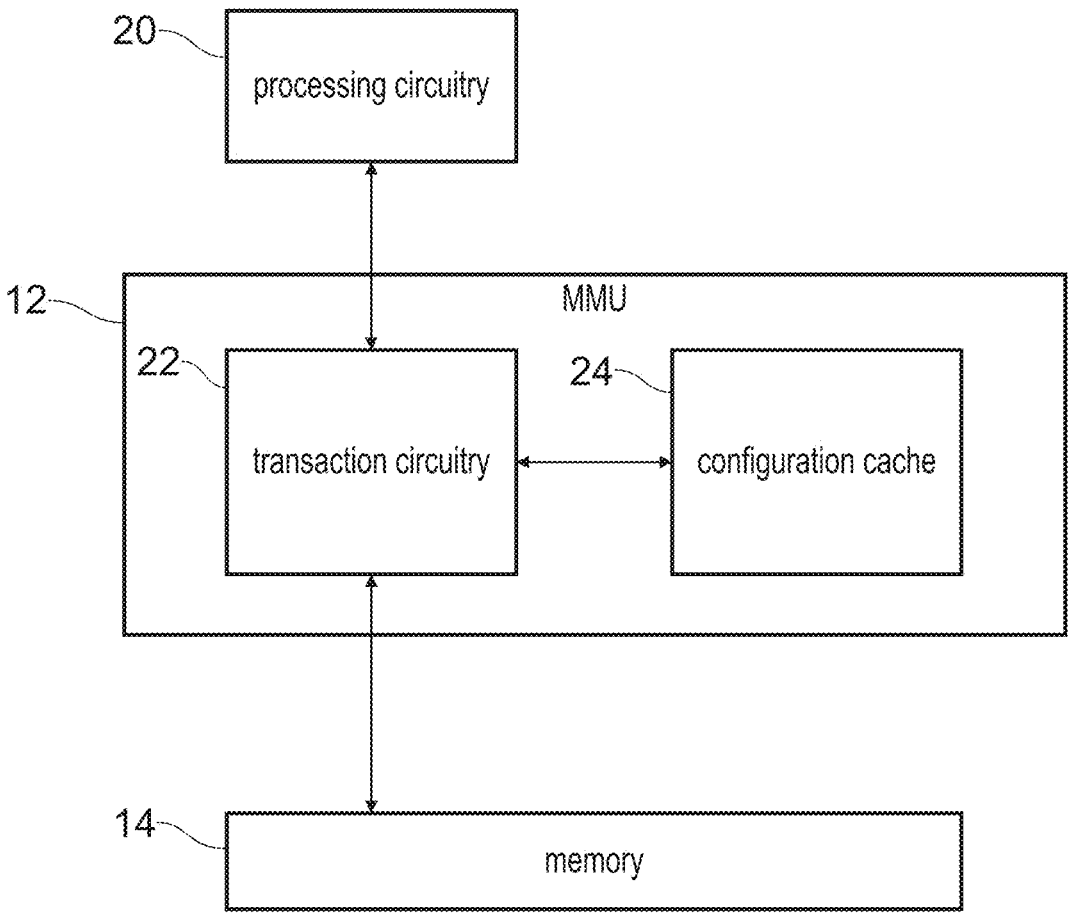
FIG. 2 schematically illustrates a data processing system according to some example embodiments.

FIG. 2 illustrates an example of an MMU 12 configured to communicate with processing circuitry 20. The processing circuitry 20, while executing data processing instructions, may generate memory access requests for data to be loaded from or stored to memory 14. The MMU 12 is configured to carry out such a request in the form of a transaction that is controlled by the transaction circuitry 22. The transaction includes one or more operations relating to accessing memory 14, such as address translation for translating a virtual address into a physical address, verifying memory attributes for checking the read/write permissions of the requesting process, or verifying cachability/sharability attributes for checking whether the requested data can be cached by the requesting master or shared to another master. The transaction also includes the movement of the requested data to or from memory 14 depending on whether the memory access request is a load or a store.

The transaction circuitry 22 is configured to control the transactions in dependence on a corresponding unit of configuration data stored in a configuration cache 24. The unit of configuration data may include any data for controlling how the transaction is performed, such as a context identifier for a particular address translation context. It will be appreciated that a unit of configuration data may be used to control a plurality of transactions or may be unique to a specific transaction. In accordance with the present techniques, each transaction also specifies a storage location in the configuration cache 24 at which the corresponding unit of configuration data is stored. By using the specified storage location, the transaction circuitry 22 is capable of directly accessing the corresponding unit of configuration data in the configuration cache 24 without needing to perform a lookup, thereby reducing the latency in accessing the unit of configuration data. Furthermore, since the unit of configuration data can be accessed faster, it is not necessary to store the unit of configuration data locally in the transaction circuitry 22. Indeed, some examples of the transaction circuitry 22 do not include local storage (e.g. registers or other RAMs) for storing units of configuration data at all. Therefore, the transaction circuitry 22 can be made smaller, thus using less circuit area and requiring less power without a significant loss in transaction performance.

Figure 3:
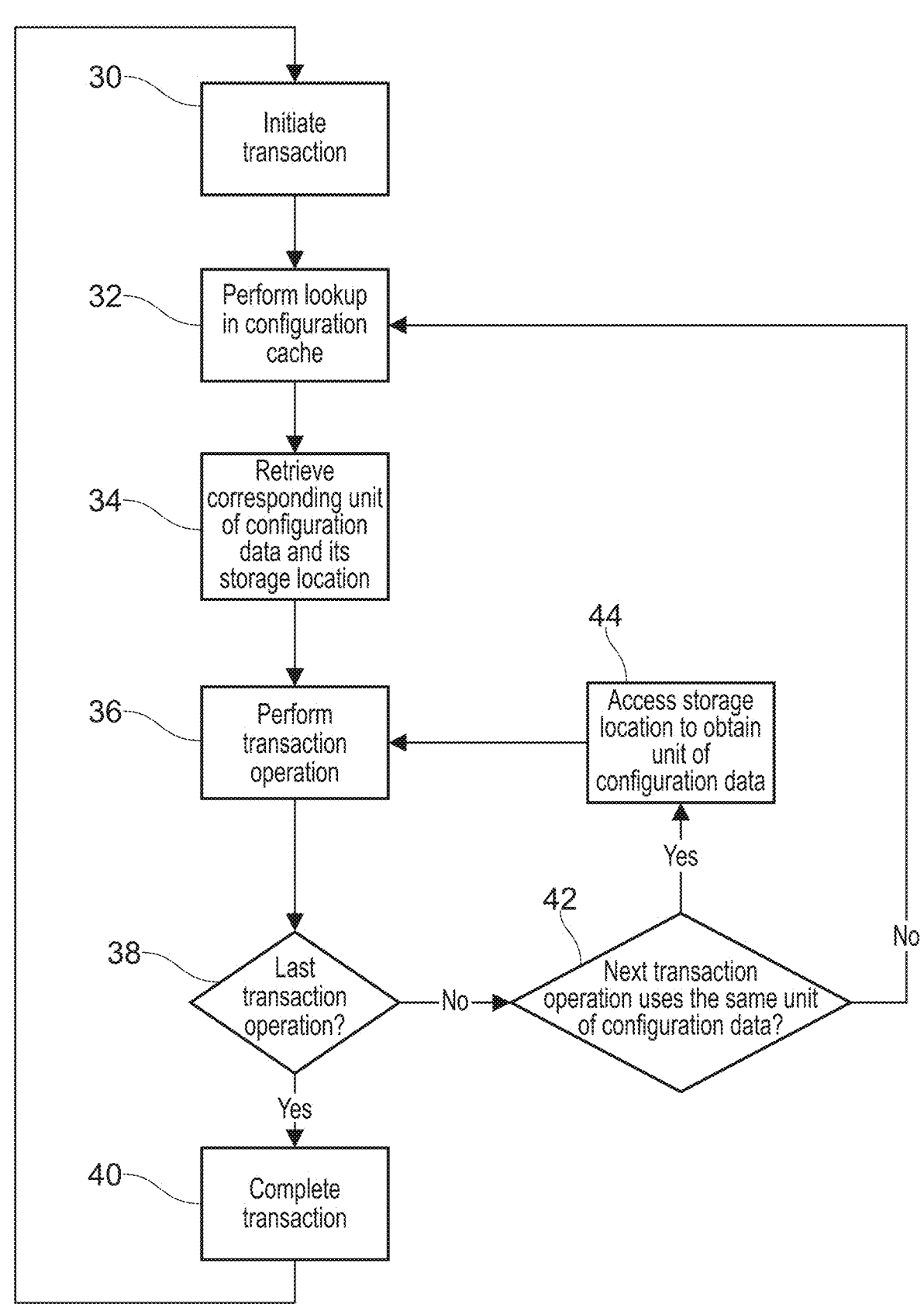
FIG. 3 shows a sequence of steps for accessing configuration data and performing transactions according to some example embodiments.

FIG. 3 illustrates a method for performing a transaction by the MMU 12 according to the present techniques. The process begins at step 30 where the transaction circuitry 22 initiates a transaction, for example in response to a memory access request from the processing circuitry 20. When the transaction is initiated, the storage location of the corresponding unit of configuration data is not yet known. Therefore, the transaction circuitry 22 performs a lookup in the configuration cache 24 at step 32.

If the corresponding unit of configuration data is present in the configuration cache 24, the lookup results in a hit and the unit of configuration data and its storage location is retrieved from the configuration cache 24 at step 34. Alternatively, if the corresponding unit of configuration data is not present in the configuration cache 24, the lookup initially results in a miss and the required unit of configuration data needs to be brought into the configuration cache. Once present in the configuration cache, its storage location can be provided at step 34. An operation of the transaction (e.g. address translation) can then be performed under the control of the unit of configuration data at step 36. It will be appreciated that the method does not include a step of storing the unit of configuration data locally in the transaction circuitry 22. The configuration data may therefore be discarded after the transaction operation has been performed.

At step 38, the transaction circuitry 22 determines whether the transaction operation that was performed in step 36 was the last transaction operation of the transaction. If so, then at step 40, the transaction is determined to be complete. If there is a next transaction operation (e.g. verifying memory attributes), then it is determined at step 42 whether the next transaction operation is to be controlled by the same unit of configuration data. If so, then the transaction circuitry 22 uses the known storage location of the corresponding unit of configuration data to directly access the storage location of the configuration cache 24 to obtain the unit of configuration data at step 44. The transaction operation can then be performed at step 36 without requiring another lookup.

On the other hand, at step 42, if the next transaction operation does not use the same unit of configuration data and instead uses a different unit of configuration data, the transaction circuitry 22 performs another lookup to locate the different unit of configuration data at step 32. The process then continues as described above.

Accordingly, when the operations of a transaction use the same unit of configuration data, the transaction can be completed without needing to locally store the unit of configuration data in the transaction circuitry 22. Accordingly and as described above, some examples of the transaction circuitry 22 may omit such local storage entirely to reduce circuit area and power consumption.

In some examples, the transaction circuitry 22 is capable of performing a plurality of transactions with overlapping lifetimes in a pipelined configuration, such that younger transactions are initiated while older transactions have not yet been completed. The configuration cache 24 may implement a usage counter to keep track of how many active transactions (i.e. transactions that have been initiated, but not yet completed) are specifying the storage location of each unit of configuration data. FIG. 4 illustrates an example of the configuration cache 24 comprising four entries. In this example, the storage location of each entry is identified by an index between 0 and 3. It will be appreciated that the index defines the location at which each entry is stored in configuration cache 26, and hence the value of the index itself may not actually be stored for each respective entry, but rather be implicit from the storage ordering of the entries. Each entry comprises a unit of configuration data and an associated usage counter. In this example, it can be seen that 'config_0' is being used by 2 active transactions and 'config_2' is being used by 1 active transaction, whereas 'config_1' and 'config_3' are not currently being used by an active transaction.

Figure 5:
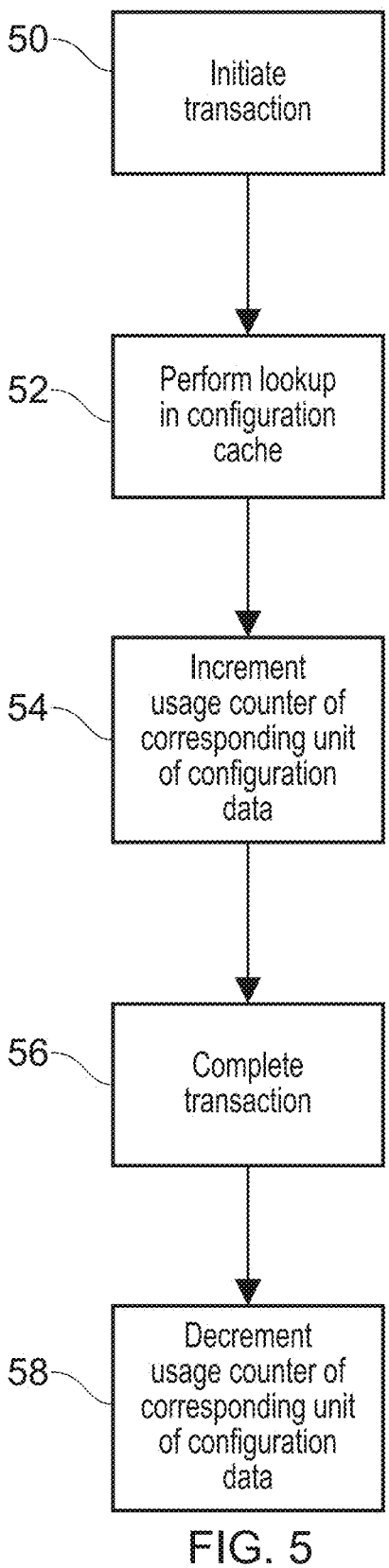
FIG. 5 shows a sequence of steps performed to manage a usage counter according to some example embodiments.

The configuration cache 24 is configured to update the usage counter according to the transactions that are being controlled by the transaction circuitry 22. FIG. 5 illustrates a sequence of steps for controlling the usage counter. At step 50, a transaction is initiated and a lookup is performed at step 52. The lookup being performed may be used by the configuration cache 24 as an indication that a transaction has been initiated. Accordingly, when the lookup results in a hit, the configuration cache 24 increments the usage counter associated with the corresponding unit of configuration data at step 54. Alternatively, if the corresponding unit of configuration data is not present in the configuration cache 24, the lookup initially results in a miss and the required unit of configuration data needs to be brought into the configuration cache. Once present in the configuration cache, the configuration cache 24 can increment the usage counter associated with the corresponding unit of configuration data at step 54. While the transaction is active and the various operations are being performed, such as those described in relation to FIG. 3, the usage counter is left unchanged. When the transaction is complete at step 56, the transaction circuitry 22 may be configured to signal the completion to the configuration cache 24. In response to the completion of the transaction, the configuration cache 24 decrements the usage counter at step 58.

It will be appreciated that the process of FIG. 5 is to be interpreted in terms of one transaction. Where multiple active transactions are being performed at the same time, multiple instances of this process can be in progress at different steps. Therefore, the usage counter of a given unit of configuration data may be incremented several times in response to several lookups before being decremented.

Figure 6:
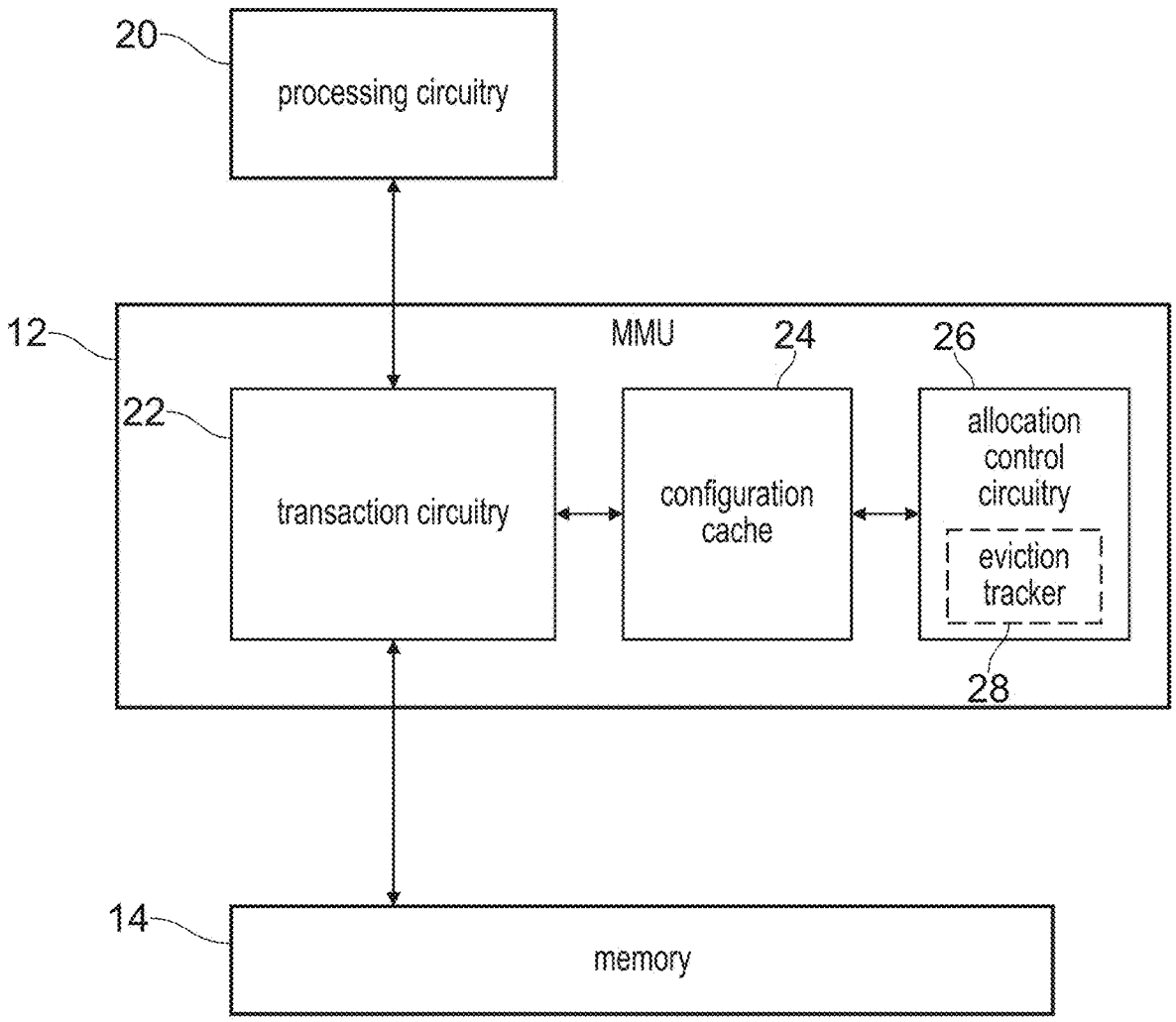
FIG. 6 schematically illustrates a data processing system according to some example embodiments.

Since the transaction circuitry 22 does not store the units of configuration data locally, it would be useful to prevent a unit of configuration data for an older transaction from being replaced by a unit of configuration data for a younger transaction. By tracking the number of active transactions that are using each unit of configuration data as described above, it is possible to priorities retaining those units of configuration data while they are being used. FIG. 6 illustrates another example of the MMU 12 that further comprises allocation control circuitry 26. In this example, where the transaction circuitry 22 initiates a transaction for which the corresponding unit of configuration data is not present in the configuration cache 24, that unit of configuration data will need to be fetched from memory 14 and allocated to the configuration cache 24. While the fetch and allocation process is occurring, the transaction circuitry 22 stalls the new transaction to prevent it from being performed. The allocation control circuitry 26 is configured to control the allocation of incoming units of configuration data into configuration cache 24.

FIG. 7 illustrates the process performed by the allocation control circuitry 26 while allocating an incoming unit of configuration data. At step 60, a lookup in the configuration cache 24 (i.e. in response to a new transaction being initiated) results in a miss. At step 62, the configuration cache 26 initiates a fetch of the incoming unit of configuration data that is required by the new transaction. To make room for the incoming unit of configuration data, the allocation control circuitry 26 is configured to select one of the existing units of configuration data to be an eviction victim. As mentioned above, to preserve the units of configuration data that are being used by active transactions, the allocation control circuitry 26 selects the eviction victim based on the value of the usage counter, so as to priorities selection of a unit of configuration data that is not being used by an active transaction. Hence at step 64 the allocation control circuitry 26 determines whether there are any units of configuration data that have a counter equal to zero.

For example, referring back to FIG. 4, the allocation control circuitry 26 would select either config_1 or config_3 as the eviction victim because their associated usage counters are both equal to 0 (i.e. indicating that no active transaction is using them). To select among multiple units of configuration data that are not being used by active transactions, the allocation control circuitry 26 may employ any eviction policy known to those skilled in the art. For example, the allocation control circuitry 26 may identify that config_1 is the least recently used unit of configuration data (as defined by a 'least-recently-used' (LRU) eviction policy) and hence config_1 is selected as the eviction victim.

Upon determining that a unit of configuration data that is not being used by an active transaction is present (i.e. Yes at step 64), the allocation control circuitry selects that unit of configuration data as the eviction victim and invalidates the eviction victim at step 66. When the incoming unit of configuration data is fetched from memory 14, the invalidated eviction victim can be overwritten with the incoming unit of configuration data at step 68. The storage location and the unit of configuration data can then be returned to the transaction circuitry 22, as described in previous examples.

It is possible in some scenarios for the transaction circuitry 22 to be controlling a sufficiently large number of active transactions such that every unit of configuration data stored in the configuration cache 24 is being used by an active transaction. Accordingly, when the allocation control circuitry 26 is selecting an eviction victim there will be no units of configuration data with a usage counter equal to 0 (i.e. No at step 64). To prevent the new transaction from being stalled for an excessive amount of time, the allocation control circuitry 26 implements a mid-transaction invalidation process at step 70. While the particular steps may vary as will be described later, the result of the mid-transaction invalidation process is that one of the units of configuration data is selected as an eviction victim while a transaction specifying that unit of configuration data is active, and eventually invalidated. Accordingly, after the mid-transaction invalidation process, the invalidated eviction victim can be overwritten in step 68 as described above.

The particular steps of mid-transaction invalidation process may vary depending on an aggressiveness to define how quickly the incoming unit of configuration data should be available in the configuration cache. For example, if the new transaction that requires the incoming unit of configuration data is of a higher priority than the active transactions, a more aggressive mid-transaction invalidation process is used, whereas if the new transaction is of lower priority, a less aggressive mid-transaction invalidation process is used.

Figure 8:
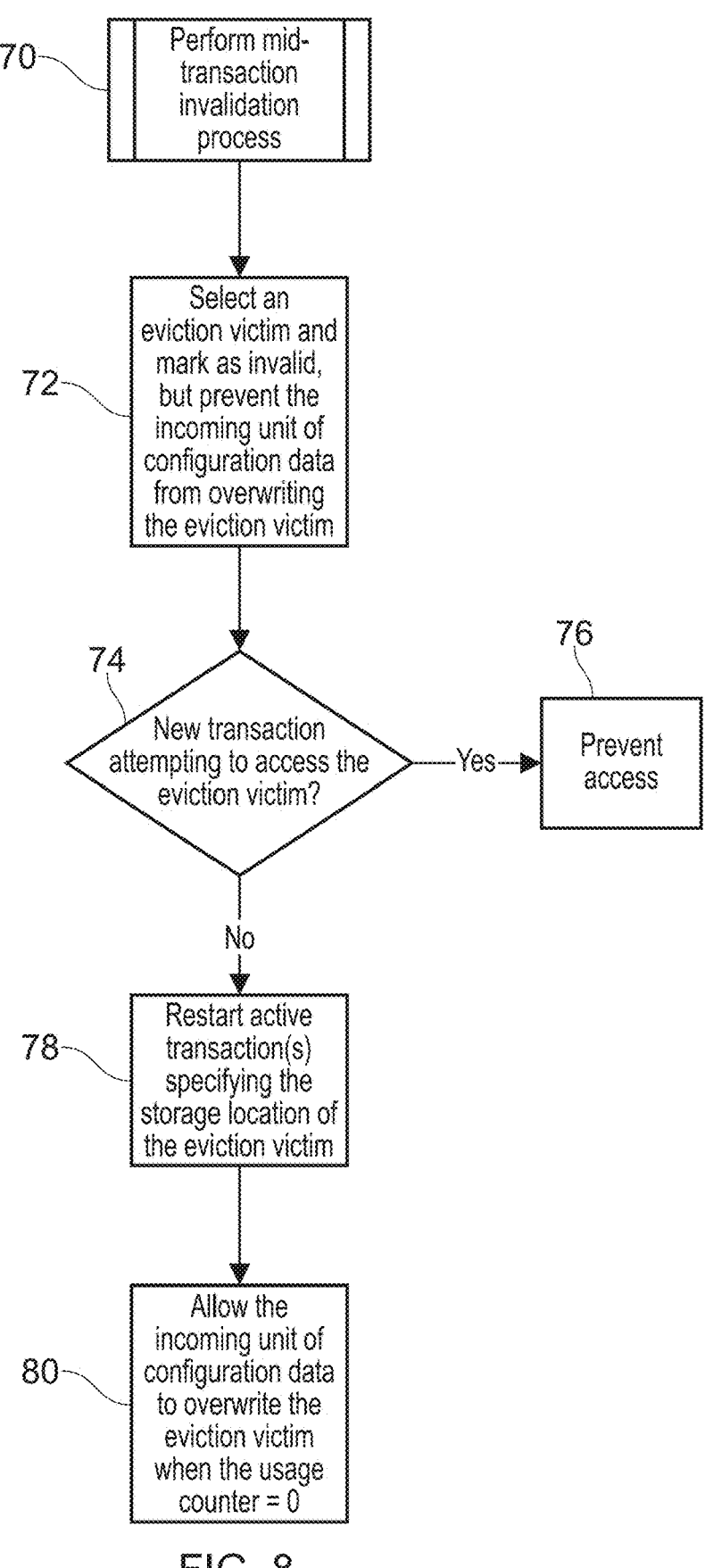
FIG. 8 shows a sequence of steps for one example of a mid-transaction invalidation process.

FIG. 8 illustrates a less aggressive example of a mid-transaction invalidation process beginning from step 70 of FIG. 7. At step 72, an eviction victim is selected, for example using an eviction policy (e.g. LRU) as described above. The eviction victim is marked as invalid, but the incoming unit of configuration data is temporarily prevented from overwriting the invalid eviction victim.

At step 74, it is determined whether there are any new transactions being initiated by the transaction circuitry 22 that are attempting to access the eviction victim. If so, the new transactions are prevented from accessing the eviction victim. Access may be prevented at step 76, for example by forcing a miss as though the eviction victim was not present in the configuration cache 24. This provides a point in time from which younger transactions initiated after that point cannot begin using the eviction victim and hence the usage counter is prevented from being incremented. On the other hand, older transactions that had been initiated before that point in time may still be allowed to access the eviction victim as normal. Accordingly, those older transactions will be performed and completed (e.g. as described with reference to FIG. 3) and the usage counter associated with the eviction victim will be decremented.

In some more aggressive examples, the mid-transaction invalidation process may optionally include restarting some of or all active transactions that specify the storage location of the eviction victim at step 78. By restarting those active transactions, the transaction circuitry 22 treats them as completed despite not having actually performed the required operations of the transactions. Accordingly, the usage counter associated with the eviction victim will be decremented more quickly.

Regardless of whether the optional restarting step is included, the mid-transaction invalidation process ends when the usage counter of the eviction victim is equal to 0, thus indicating that there are no active transactions specifying the storage location of the eviction victim. Therefore, the eviction victim can be safely replaced and the incoming unit of configuration data is allowed to overwrite the eviction victim at step 80.

A still more aggressive example of a mid-transaction invalidation process can be used when the allocation control circuitry 26 further comprises an eviction tracker 28 as shown in FIG. 6. It will be appreciated that, in implementations that do not employ this more aggressive mid-transaction invalidation process, the eviction tracker 28 is not essential. The eviction tracker 28 is configured to store details about one or more units of configuration data that have recently been evicted from the configuration cache 24. In particular, when a unit of configuration data is evicted, the eviction tracker 28 may store information indicative of the storage location of the configuration cache 24 at which the unit of configuration data was stored, and the value of the associated usage counter when the unit of configuration data was evicted.

Figure 9:
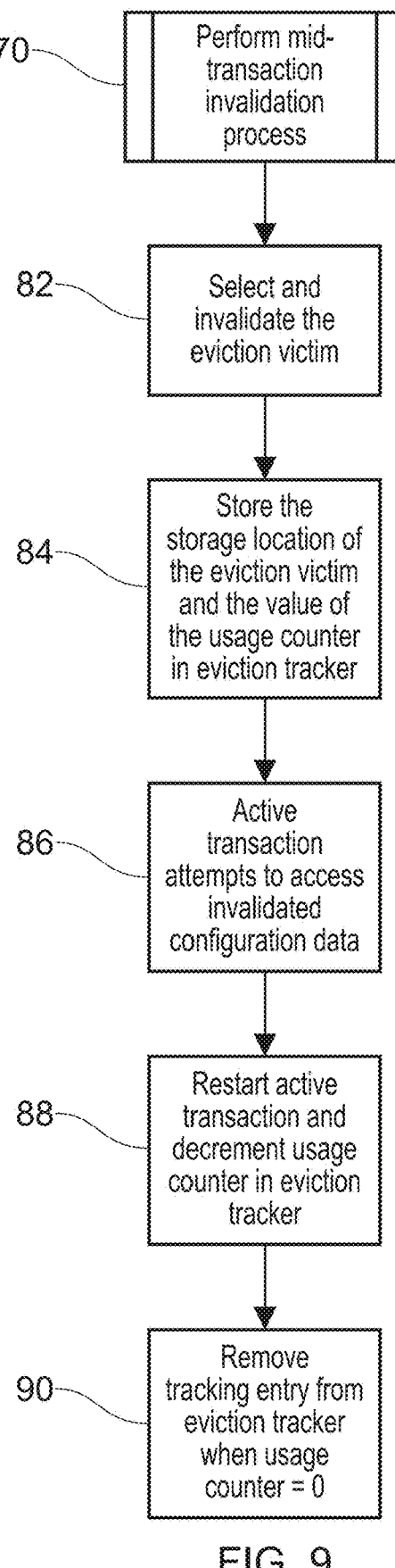
FIG. 9 shows a sequence of steps for another example of a mid-transaction invalidation process.

FIG. 9 illustrates the steps of the more aggressive example of a mid-transaction invalidation process that can be used when the allocation control circuitry further comprises the eviction tracker 28. The mid-transaction invalidation process again begins at step 70 of FIG. 7. At step 82, an eviction victim is selected as described in previous examples using an eviction policy (e.g. LRU). Similar to step 72 of FIG. 8, the selected eviction victim is marked as invalid, but in contrast to step 72, the incoming unit of configuration data is not prevented from overwriting the eviction victim. Therefore, the incoming unit of configuration data can be allocated to the configuration cache 26 and the new transaction can continue more quickly.

Since there would still be outstanding active transactions that are using the, now evicted, unit of configuration data, the details of the eviction victim are stored to the eviction tracker 28 in step 84. In particular, the storage location of the eviction victim and the value of its associated usage counter is stored in the eviction tracker 28. Based on the value of the usage counter, it is known how many outstanding active transactions are using the eviction victim. The eviction tracker 28 monitors when those active transactions attempt to access the eviction victim at step 86, and then causes the transaction circuitry 22 to restart the transaction at step 88. As the outstanding active transactions are restarted, the usage counter in the eviction tracker 28 can be decremented. Alternatively, the eviction tracker 28 can count how many active transactions are restarted in step 88 until it counts to the value of the usage counter.

When the value of the usage counter is decremented to 0, indicating that all of the active transactions that use the, now evicted, eviction victim have been restarted, it is no longer necessary for the eviction tracker 28 to continue tracking this entry. Therefore, the tracking entry can be removed (or simply invalidated) at step 90.

By employing the one or more variants of mid-transaction invalidation process as described above, the allocation control circuitry 26 is capable of allocating an incoming unit of configuration data more quickly than waiting for a unit of configuration data to be unused. Furthermore, some examples of the allocation control circuitry 26 may be capable of choosing how aggressive the mid-transaction invalidation process should be, for example based on a priority of the new transaction being initiated by the transaction circuitry 22.

In some examples, the transaction circuitry 22 can initiate several transactions in relatively quick succession, where the configuration of each of those transactions is controlled by the same corresponding unit of configuration data. In such examples, the first of these transactions will cause a lookup in the configuration cache 24 as described in previous examples. Since the corresponding unit of configuration data may not have been used recently, the lookup may result in a miss thus causing the corresponding unit of configuration data to be fetched from memory 14 to be allocated to the configuration cache 24. During this time, the first transaction is temporarily stalled as described previously and the second transaction is initiated. The configuration cache 24 in these examples is configured to indicate when a unit of configuration data is currently being fetched from memory 14 to prevent unnecessary requests to memory 14 from being generated.

Figure 10:
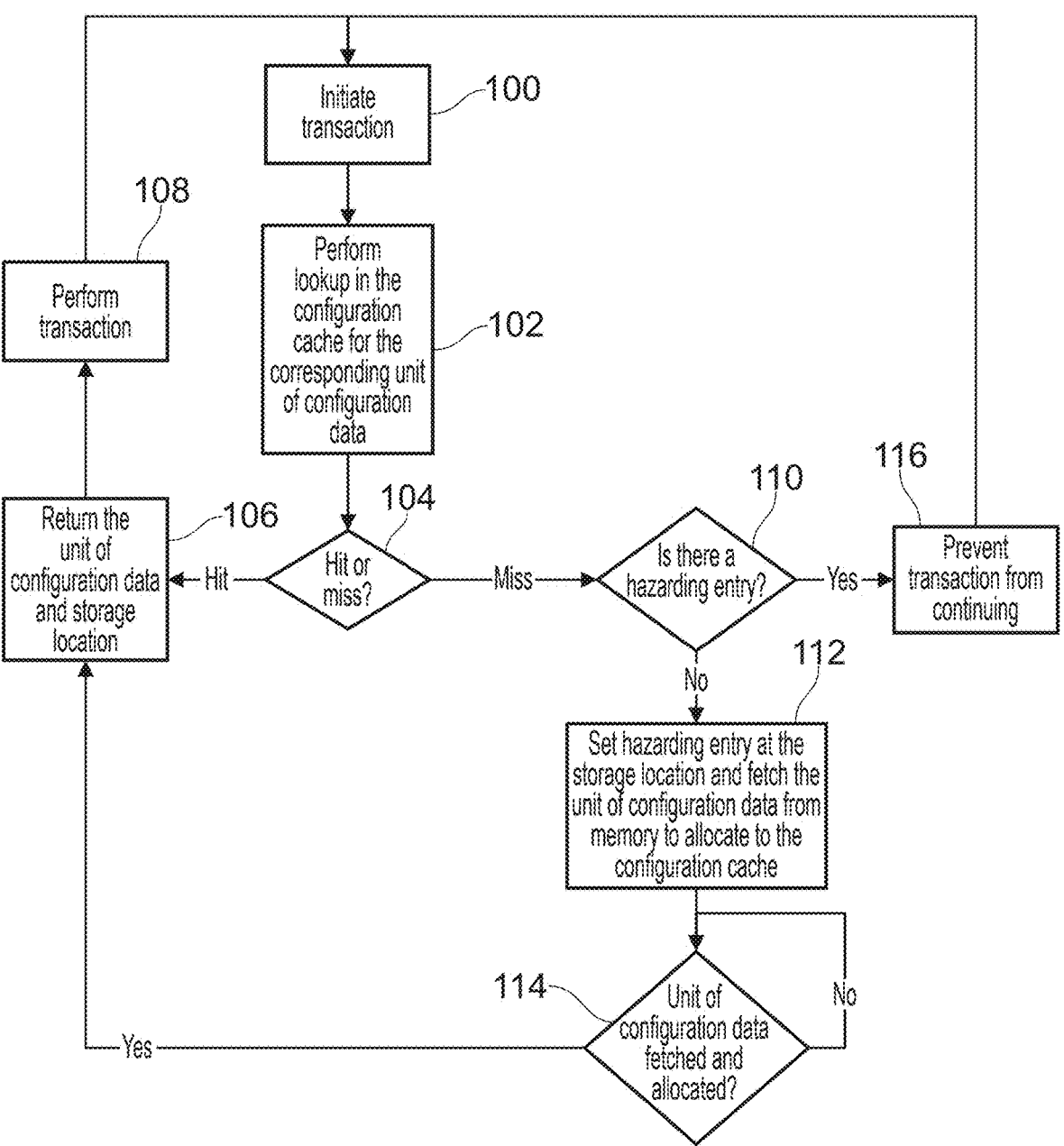
FIG. 10 shows a sequence of steps for managing hazards in a configuration cache according to some example embodiments.

In particular, the configuration cache 24 is configured to implement a hazarding protocol for such transactions in response to lookups resulting in a miss. FIG. 10 illustrates the steps that are performed according to one example of the hazarding protocol. In step 100, a transaction is initiated by the transaction circuitry 22 as described in previous examples and a lookup in performed in the configuration cache to locate the corresponding unit of configuration data in step 102. At step 104, is it determined whether the lookup results in a hit or a miss, indicating that the corresponding unit of configuration data is present or not present respectively. If the corresponding unit of configuration data is present, then at step 106, then the unit of configuration data and its storage location are returned to the transaction circuitry 22 as described in previous examples so that the transaction can be performed in step 108.

If, at step 104, it is determined that the corresponding unit of configuration data is not present, the lookup results in a miss. It is then determined whether there is a hazarding entry present at step 110. If not, then it is known that the corresponding unit of configuration data is not currently being fetched from memory 14. Accordingly at step 112, the configuration cache 24 sets a hazarding entry and causes the corresponding unit of configuration to be fetched from memory 14. The hazarding entry is set so that if any subsequent transactions are initiated and require the same unit of configuration data, the configuration cache 24 is prevented from generating another request to fetch that unit of configuration data from memory 14. Accordingly, the traffic on any data lines between the configuration cache 24 and the memory 14 can be reduced.

At step 114, the process waits until the corresponding unit of configuration data has been fetched from memory 14 and allocated to the configuration cache 24. The hazarding entry is thus cleared. Once this has occurred, the unit of configuration data and its storage location are returned to the transaction circuitry 22 at step 106, as described in previous examples.

Returning to step 110, if there is already a hazarding entry present in the configuration cache 24, then it is known that a request to fetch the corresponding unit of configuration data from memory 14 is already underway. Accordingly, the transaction is prevented from continuing at step 116. This can be achieved in several different ways, such as stalling the transaction or placing it into a queue of pending active transactions that are waiting for a hazard to clear. Alternatively, the transaction may be restarted, so that the transaction circuitry 22 re-initiates the transaction after a period of time, by which time the corresponding unit of configuration data may have been fetched.

Figure 11:
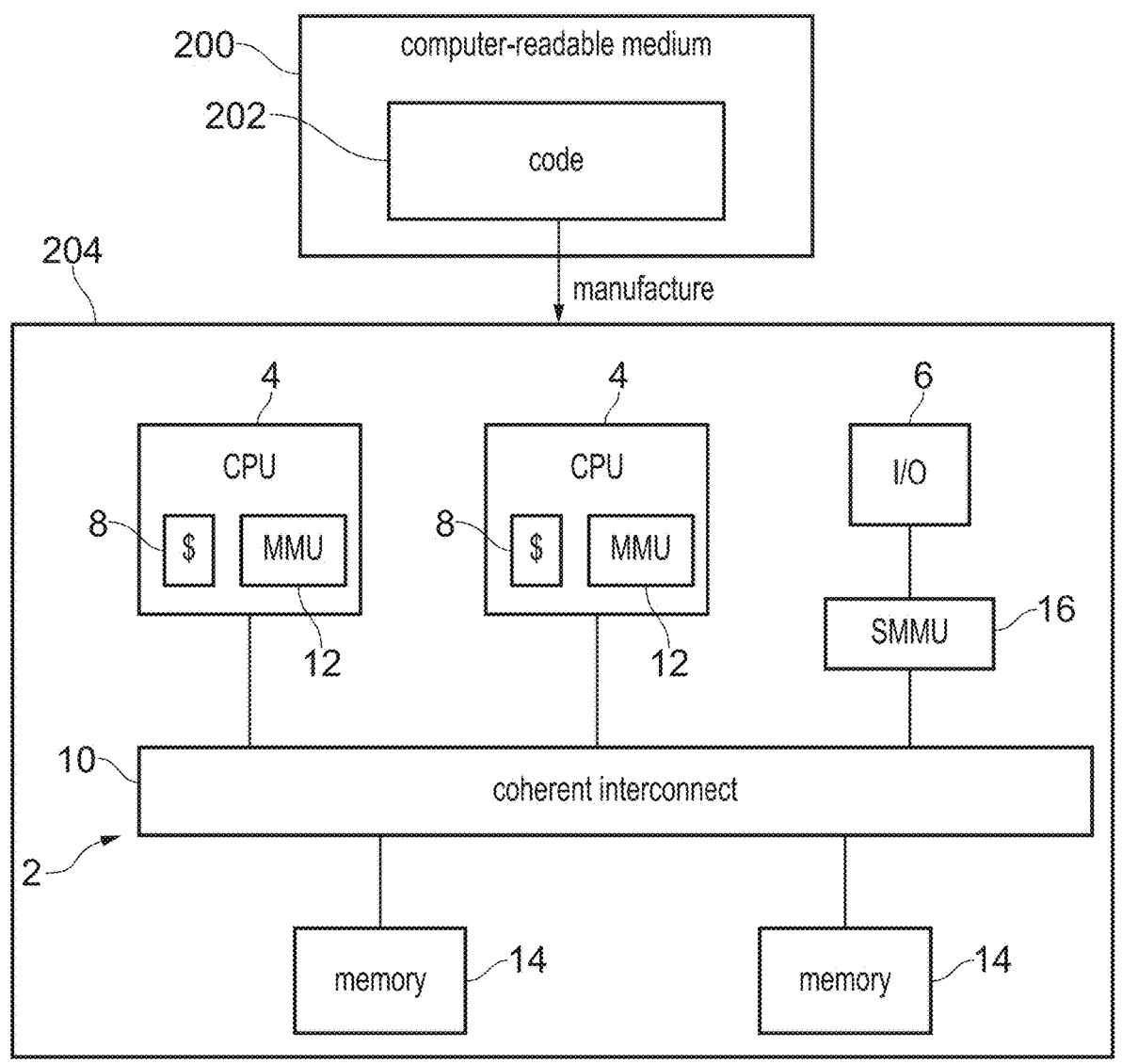
FIG. 11 schematically illustrates the use of a computer-readable medium for manufacturing an apparatus according to some example embodiments.

FIG. 11 illustrates an example of concepts described herein embodied in computer-readable code 202 for fabrication of an apparatus 204 that embodies the described concepts. For example, the computer-readable code 202 can be used at one or more stages of a semiconductor design and fabrication process, including an electronic design automation (EDA) stage, to fabricate an integrated circuit comprising the apparatus 204 embodying the concepts. The above computer-readable code may additionally or alternatively enable the definition, modelling, simulation, verification and/or testing of an apparatus 204 embodying the concepts described herein.

For example, the computer-readable code 202 for fabrication of an apparatus 204 embodying the concepts described herein can be embodied in code defining a hardware description language (HDL) representation of the concepts. For example, the code 202 may define a register-transfer-level (RTL) abstraction of one or more logic circuits for defining an apparatus 204 embodying the concepts. The code 202 may define a HDL representation of the one or more logic circuits embodying the apparatus 204 in Verilog, System Verilog, Chisel, or VHDL (Very High-Speed Integrated Circuit Hardware Description Language) as well as intermediate representations such as FIRRTL. Computer-readable code 202 may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code 202 may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code 202 a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code 202 may comprise a mix of code representations for fabrication of an apparatus 204 (or indeed just any component of the apparatus 204), for example including a mix of one or more of an RTL representation, a netlist representation, or another computer-readable definition to be used in a semiconductor design and fabrication process to fabricate an apparatus 204 embodying the invention. Alternatively or additionally, the concept may be defined in a combination of a computer-readable definition to be used in a semiconductor design and fabrication process to fabricate an apparatus 204 and computer-readable code 202 defining instructions which are to be executed by the defined apparatus once fabricated.

Such computer-readable code can be disposed in any known transitory computer-readable medium 200 (such as wired or wireless transmission of code over a network) or non-transitory computer-readable medium 200 such as semi-conductor, magnetic disk, or optical disc. An integrated circuit fabricated using the computer-readable code 202 may comprise components such as one or more of a central processing unit, graphics processing unit, neural processing unit, digital signal processor or other components that individually or collectively embody the concept.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 12:
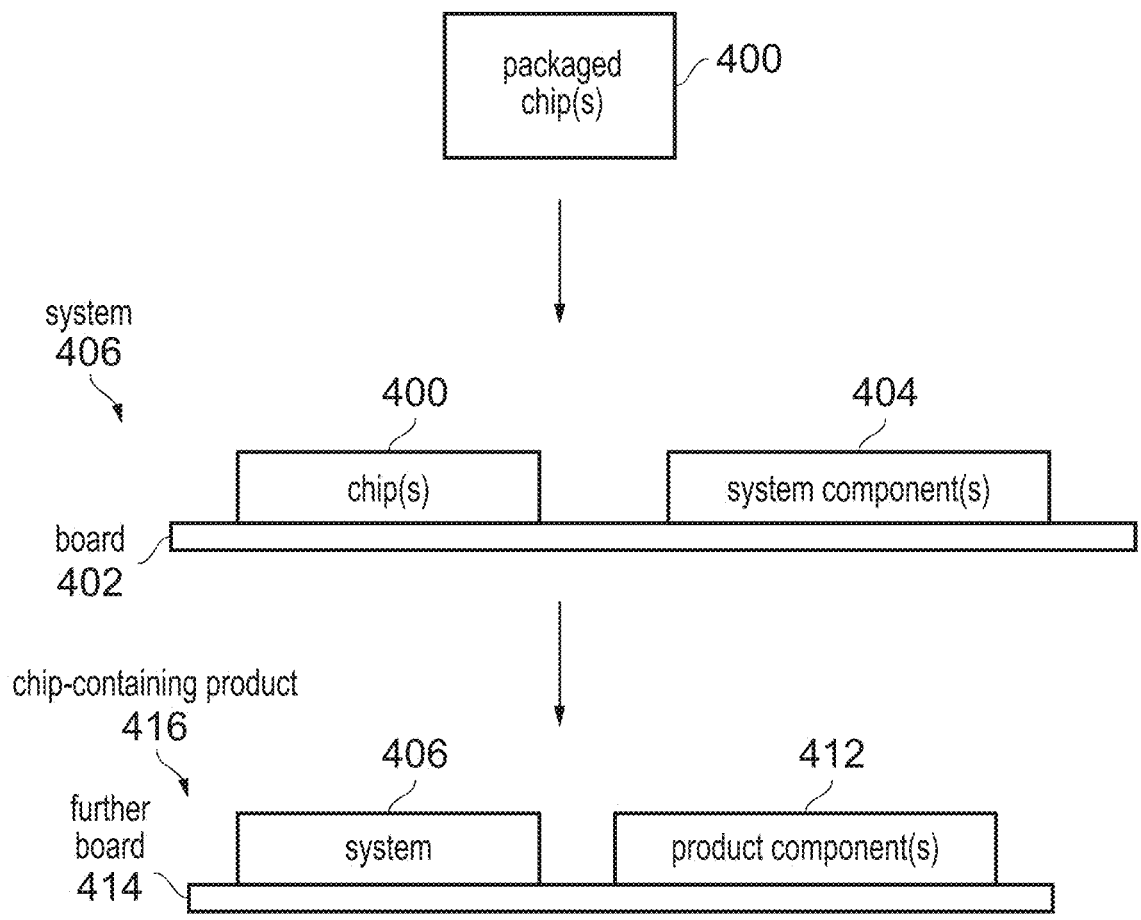
FIG. 12 schematically illustrates a system and a chip-containing product according to some example embodiments.

As shown in FIG. 12, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Some examples of the present invention are set out in the following clauses:

(1) An apparatus comprising:

transaction circuitry configured to control transactions, wherein a configuration of each transaction is controlled by a corresponding unit of configuration data; and a configuration cache configured to hold a plurality of units of configuration data, wherein each transaction specifies a storage location in the configuration cache at which the corresponding unit of configuration data is stored, and the transaction circuitry is configured to access the corresponding unit of configuration data at the storage location to control each transaction.

(2) The apparatus of clause (1), wherein a plurality of the transactions specify a same storage location in the configuration cache.

(3) The apparatus of clause (1) or clause (2), wherein the configuration cache is configured to store a usage counter associated with each of the plurality of units of configuration data, the usage counter being indicative of a number of active transactions specifying the storage location of an associated unit of configuration data.

(4) The apparatus of clause (3), wherein the configuration cache is configured to:

increment the usage counter in response to detecting an initiation of a transaction by the transaction circuitry; and decrement the usage counter in response to detecting a completion of a transaction by the transaction circuitry.

(5) The apparatus of clause (4), wherein the configuration cache is configured to detect the initiation of the transaction in response to the transaction circuitry performing a lookup in the configuration cache.

(6) The apparatus of any of clauses (3) to (5), comprising:
allocation control circuitry configured to control allocation of an incoming unit of configuration data in the configuration cache, wherein
when the incoming unit of configuration data is being allocated, the allocation control circuitry is configured to select one of the plurality of units of configuration data to be an eviction victim based on a value of the usage counter.

(7) The apparatus of clause (6), wherein the allocation control circuitry is configured to evict the eviction victim in response to the value of the usage counter indicating that no active transactions are specifying the storage location of the eviction victim.

(8) The apparatus of clause (6) or clause (7), wherein in response to the value of the usage counter indicating that at least one active transaction is specifying the storage location of the eviction victim, the allocation control circuitry is configured to cause the transaction circuitry to stall a new transaction having a configuration that is controlled by the incoming unit of configuration data.

(9) The apparatus of any of clauses (6) to (8), wherein in response to the value of the usage counter indicating that at least one active transaction is specifying the storage location of the eviction victim, the allocation control circuitry is configured to perform a mid-transaction invalidation process to invalidate the eviction victim while the at least one active transaction is being performed.

(10) The apparatus of clause (9), wherein the mid-transaction invalidation process comprises:
causing the transaction circuitry to stop accessing the eviction victim; and
evicting the eviction victim from the configuration cache in response to the value of the usage counter indicating that no active transactions are specifying the storage location of the eviction victim.

(11) The apparatus of clause (10), wherein the causing step of the mid-transaction invalidation process comprises:
marking the eviction victim as invalid and retaining the eviction victim in the configuration cache; and
preventing the transaction circuitry from accessing the eviction victim to control a future transaction while the eviction victim is marked as invalid.

(12) The apparatus of clause (11), wherein the causing step of the mid-transaction invalidation process comprises:
permitting the transaction circuitry to access the eviction victim to control a preceding transaction while the eviction victim is marked as invalid;
wherein the preceding transaction was initiated a predetermined period of time before the mid-transaction invalidation process.

(13) The apparatus of any of clauses (10) to (12), wherein the causing step of the mid-transaction invalidation process comprises causing the transaction circuitry to restart one or more transactions specifying the storage location of the eviction victim.

(14) The apparatus of clause (9), wherein the apparatus comprises eviction tracking circuitry configured to track evicted entries from the configuration cache; and
the mid-transaction invalidation process comprises:
evicting the eviction victim; and
storing the storage location of the eviction victim and the value of the usage counter in the eviction tracking circuitry.

(15) The apparatus of any preceding clause, wherein
in response to initiating a new transaction, the transaction circuitry is configured to perform a lookup of the configuration cache for the corresponding unit of configuration data; and
in response to the lookup resulting in a miss, the configuration cache is configured to insert a hazarding entry to indicate that the corresponding unit of configuration data is being fetched from memory.

(16) The apparatus of clause (15), wherein
in response the lookup of the configuration cache resulting in a hit on the hazarding entry, the transaction circuitry is configured to prevent the new transaction from continuing.

(17) A system comprising:
the apparatus of any preceding clause, implemented in at least one packaged chip;
at least one system component; and
a board,
wherein the at least one packaged chip and the at least one system component are assembled on the board.

(18) A chip-containing product comprising the system of clause (17), wherein the system is assembled on a further board with at least one other product component.

(19) A method comprising:
controlling transactions, wherein a configuration of each transaction is controlled by a corresponding unit of configuration data; and
holding a plurality of units of configuration data in a configuration cache, wherein
each transaction specifies a storage location in the configuration cache at which the corresponding unit of configuration data is stored, and
accessing the corresponding unit of configuration data at the storage location to control each transaction.

(20) Computer-readable code for fabrication of an apparatus comprising:
transaction circuitry configured to control transactions, wherein a configuration of each transaction is controlled by a corresponding unit of configuration data; and
a configuration cache configured to hold a plurality of units of configuration data, wherein
each transaction specifies a storage location in the configuration cache at which the corresponding unit of configuration data is stored, and the transaction circuitry is configured to access the corresponding unit of configuration data at the storage location to control each transaction.

(21) A non-transitory computer-readable medium storing the computer-readable code of clause (20).

In brief overall summary, apparatuses, systems, methods, computer-readable media, and computer code are disclosed. An apparatus comprises transaction circuitry configured to control transactions, wherein a configuration of each transaction is controlled by a corresponding unit of configuration data; and a configuration cache configured to hold a plurality of units of configuration data. Each transaction specifies a storage location in the configuration cache at which the corresponding unit of configuration data is stored, and the transaction circuitry is configured to access the corresponding unit of configuration data at the storage location to control each transaction. Hence the present techniques allow for more efficient use of configuration data for controlling the configuration of transactions. By specifying a storage location with the transaction, the corresponding unit of configuration data can be accessed directly in a configuration cache meaning that local storage for storing one or more duplicate copies of the configuration data can be excluded without a significant loss of transaction performance.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus comprising:
transaction circuitry configured to control transactions, wherein a configuration of each transaction is controlled by a corresponding unit of configuration data; and
a configuration cache configured to hold a plurality of units of configuration data, wherein
each transaction specifies a storage location in the configuration cache at which the corresponding unit of configuration data is stored, and the transaction circuitry is configured to access the corresponding unit of configuration data at the storage location to control each transaction.

2. The apparatus of claim 1, wherein a plurality of the transactions specify a same storage location in the configuration cache.

3. The apparatus of claim 1, wherein the configuration cache is configured to store a usage counter associated with each of the plurality of units of configuration data, the usage counter being indicative of a number of active transactions specifying the storage location of an associated unit of configuration data.

4. The apparatus of claim 3, wherein the configuration cache is configured to:
increment the usage counter in response to detecting an initiation of a transaction by the transaction circuitry; and
decrement the usage counter in response to detecting a completion of a transaction by the transaction circuitry.

5. The apparatus of claim 4, wherein the configuration cache is configured to detect the initiation of the transaction in response to the transaction circuitry performing a lookup in the configuration cache.

6. The apparatus of claim 3, comprising:
allocation control circuitry configured to control allocation of an incoming unit of configuration data in the configuration cache, wherein
when the incoming unit of configuration data is being allocated, the allocation control circuitry is configured to select one of the plurality of units of configuration data to be an eviction victim based on a value of the usage counter.

7. The apparatus of claim 6, wherein the allocation control circuitry is configured to evict the eviction victim in response to the value of the usage counter indicating that no active transactions are specifying the storage location of the eviction victim.

8. The apparatus of claim 6, wherein in response to the value of the usage counter indicating that at least one active transaction is specifying the storage location of the eviction victim, the allocation control circuitry is configured to cause the transaction circuitry to stall a new transaction having a configuration that is controlled by the incoming unit of configuration data.

9. The apparatus of claim 6, wherein in response to the value of the usage counter indicating that at least one active transaction is specifying the storage location of the eviction victim, the allocation control circuitry is configured to perform a mid-transaction invalidation process to invalidate the eviction victim while the at least one active transaction is being performed.

10. The apparatus of claim 9, wherein the mid-transaction invalidation process comprises:
causing the transaction circuitry to stop accessing the eviction victim; and
evicting the eviction victim from the configuration cache in response to the value of the usage counter indicating that no active transactions are specifying the storage location of the eviction victim.

11. The apparatus of claim 10, wherein the causing step of the mid-transaction invalidation process comprises:
marking the eviction victim as invalid and retaining the eviction victim in the configuration cache; and
preventing the transaction circuitry from accessing the eviction victim to control a future transaction while the eviction victim is marked as invalid.

12. The apparatus of claim 11, wherein the causing step of the mid-transaction invalidation process comprises:
permitting the transaction circuitry to access the eviction victim to control a preceding transaction while the eviction victim is marked as invalid;
wherein the preceding transaction was initiated a predetermined period of time before the mid-transaction invalidation process.

13. The apparatus of claim 10, wherein the causing step of the mid-transaction invalidation process comprises causing the transaction circuitry to restart one or more transactions specifying the storage location of the eviction victim.

14. The apparatus of claim 9, wherein the apparatus comprises eviction tracking circuitry configured to track evicted entries from the configuration cache; and
the mid-transaction invalidation process comprises:
evicting the eviction victim; and
storing the storage location of the eviction victim and the value of the usage counter in the eviction tracking circuitry.

15. The apparatus of claim 1, wherein
in response to initiating a new transaction, the transaction circuitry is configured to perform a lookup of the configuration cache for the corresponding unit of configuration data; and
in response to the lookup resulting in a miss, the configuration cache is configured to insert a hazarding entry to indicate that the corresponding unit of configuration data is being fetched from memory.

16. The apparatus of claim 15, wherein in response the lookup of the configuration cache resulting in a hit on the hazarding entry, the transaction circuitry is configured to prevent the new transaction from continuing.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17, wherein the system is assembled on a further board with at least one other product component.

19. A method comprising:

controlling transactions, wherein a configuration of each transaction is controlled by a corresponding unit of configuration data; and holding a plurality of units of configuration data in a configuration cache, wherein each transaction specifies a storage location in the configuration cache at which the corresponding unit of configuration data is stored, and accessing the corresponding unit of configuration data at the storage location to control each transaction.

20. A non-transitory computer-readable medium storing computer-readable code for fabrication of an apparatus comprising:

transaction circuitry configured to control transactions, wherein a configuration of each transaction is controlled by a corresponding unit of configuration data; and a configuration cache configured to hold a plurality of units of configuration data, wherein each transaction specifies a storage location in the configuration cache at which the corresponding unit of configuration data is stored, and the transaction circuitry is configured to access the corresponding unit of configuration data at the storage location to control each transaction.

* * * * *